(12) United States Patent
Seguchi

(10) Patent No.: US 6,380,653 B1
(45) Date of Patent: Apr. 30, 2002

(54) ROTATIONAL POWER CONVERTER FOR HYBRID ELECTRIC VEHICLE

(75) Inventor: Masahiro Seguchi, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/574,451

(22) Filed: May 19, 2000

(30) Foreign Application Priority Data

Jun. 4, 1999 (JP) ............................................ 11-158010

(51) Int. Cl.$^7$ ............................ H02K 1/22; H02K 7/20; H02K 16/00; H02K 47/04
(52) U.S. Cl. ........................ 310/112; 310/114; 310/266
(58) Field of Search ................................. 310/114, 112, 310/113, 103, 266, 105, 75 D, 162; 290/45, 46; 322/46; 180/65.4–65.6, 305; 318/439, 34, 539

(56) References Cited

U.S. PATENT DOCUMENTS

| | | | | |
|---|---|---|---|---|
| 3,683,249 A | * | 8/1972 | Shibata | 318/730 |
| 3,789,281 A | * | 1/1974 | Shibata | 318/696 |
| 4,260,919 A | * | 4/1981 | Fleming | 310/113 |
| 4,375,047 A | * | 2/1983 | Nelson et al. | 310/112 |
| 4,407,132 A | * | 10/1983 | Kawakatsu et al. | 60/716 |
| 5,508,574 A | * | 4/1996 | Vlock | 310/113 |
| 5,675,203 A | * | 10/1997 | Schulze et al. | 310/113 |
| 5,744,895 A | | 4/1998 | Seguchi et al. | 310/266 |
| 5,793,136 A | * | 8/1998 | Redzic | 310/114 |
| 5,818,116 A | * | 10/1998 | Nakae et al. | 290/38 R |

FOREIGN PATENT DOCUMENTS

| JP | 58-130704 | 8/1983 |
|---|---|---|
| JP | 8-251710 | 9/1996 |

* cited by examiner

*Primary Examiner*—Tran Nguyen
(74) *Attorney, Agent, or Firm*—Pillsbury Winthrop

(57) ABSTRACT

A rotational power converter is composed of a stator fixed to a cylindrical housing and a first rotor and a second rotor rotatably supported in the housing. The first rotor is driven by an internal combustion engine, and electric power is supplied to the stator from a battery, forming a rotating magnetic field in the stator. Rotational power is electromagnetically transferred from the first rotor to the second rotor that is connected to driving wheels of a vehicle. The amount of the rotational power of the second rotor is adjusted by controlling electric current supplied to the stator. The battery either supplies power or receives power according to the amount of the rotational power of the second rotor. Since the electric current is supplied only to the stator fixed in the housing, no electric feeder having slip-rings and brushes is necessary. Accordingly, the rotational power converter is made small in size and its reliability is improved.

9 Claims, 6 Drawing Sheets t=0 t=π/12 t=π/6 t=π/4 t=π/3

US 6,380,653 B1

ROTATIONAL POWER CONVERTER FOR HYBRID ELECTRIC VEHICLE

CROSS-REFERENCE TO RELATED APPLICATION

This application is based upon and claims benefit of priority of Japanese Patent Application No. Hei-11-158010 filed on Jun. 4, 1999, the content of which is incorporated herein by reference.

BACKGROUND OF THE INVENTION

1. Field of the Invention

The present invention relates to a rotational power converter that converts an output of an internal combustion engine into a driving force of a hybrid electric vehicle driven by combination of the engine and an electric power.

2. Description of Related Art

A device for driving a hybrid electric vehicle by combination of an engine and a battery is disclosed in JP-A-8-251710. In this device, an electrical coupling for changing a rotational speed of the engine and an electric motor for assisting a driving torque of the vehicle are provided. The device helps to save a driving energy and to reduce harmful exhaust gas. In this device, however, it is necessary to provide an electric feeder composed of brushes and slip-rings for supplying electric current to the motor. The electric feeder is often detrimental to durability or reliability of the device.

SUMMARY OF THE INVENTION

The present invention has been made in view of the above-mentioned problem, and an object of the present invention is to provide an improved device for converting an engine output to a driving power of a hybrid vehicle in a controlled manner, and more particularly to provide a reliable rotational power converter having no electric feeder.

The rotational power converter of the present invention includes a cylinder-shaped housing, a first stator, a first rotor, a second rotor and a second stator, those stators and rotors being all disposed in the cylinder-shaped housing. The first rotor is connected to an output shaft of an internal combustion engine and is driven by the engine, while the second rotor is connected to driving wheels of an automotive vehicle through reduction gears and supplies rotational power to the driving wheels. Electric power is supplied to windings disposed in both stators from a DC battery through respective inverters.

The first stator including a three-phase winding is fixed in the housing along the longitudinal center axis of the housing. A rotating magnetic field is generated in the first stator by supplying excitation current to the three-phase winding. The first rotor is rotatably supported in the housing, surrounding the first stator, and is driven by the engine. The second rotor is also rotatably supported in the housing, surrounding the first rotor, and is connected to the deriving wheels to supply rotating power thereto. The second stator having a winding is fixed in the housing surrounding the second rotor. A magnetic field is generated in the second stator by supplying electric current thereto from the battery through the inverter.

Both the first and second rotors are placed under the influence of the rotating magnetic field generated in the first stator. When the first rotor is rotated by the engine, rotational power is electromagnetially transferred to the second rotor which drives the driving wheels of the vehicle. The rotational power of the second rotor is adjusted by controlling electric current supplied to the three-phase winding of the first stator. The battery supplies power to the first stator winding or receives power therefrom according to the amount of rotational power of the second rotor. The second rotor is also placed under the influence of the magnetic field generated in the second stator. Accordingly, the battery supplies power to the second stator winding or receives power therefrom according to the rotational power of the second rotor. Thus, the driving force supplied to the driving wheels from the second rotor is controlled or adjusted by controlling the electric current supplied to both stators.

Since the electric current is supplied only to the first and second stators, not to the rotors, in the rotational power converter of the present invention, there is no need to provide an electric feeder composed of slip-rings and brushes. Therefore, the converter can be made smaller in size, and its reliability is improved.

The positions of the first rotor and the second rotor in the housing may be reversed, so that the second rotor is disposed closer to the center axis of the housing. It is also possible to divide the second rotor into two portions connected in tandem and to place them along the longitudinal center line of the housing.

Other objects and features of the present invention will become more readily apparent from a better understanding of the preferred embodiments described below with reference to the following drawings.

DETAILED DESCRIPTION OF THE PREFERRED EMBODIMENTS

Figure 1:
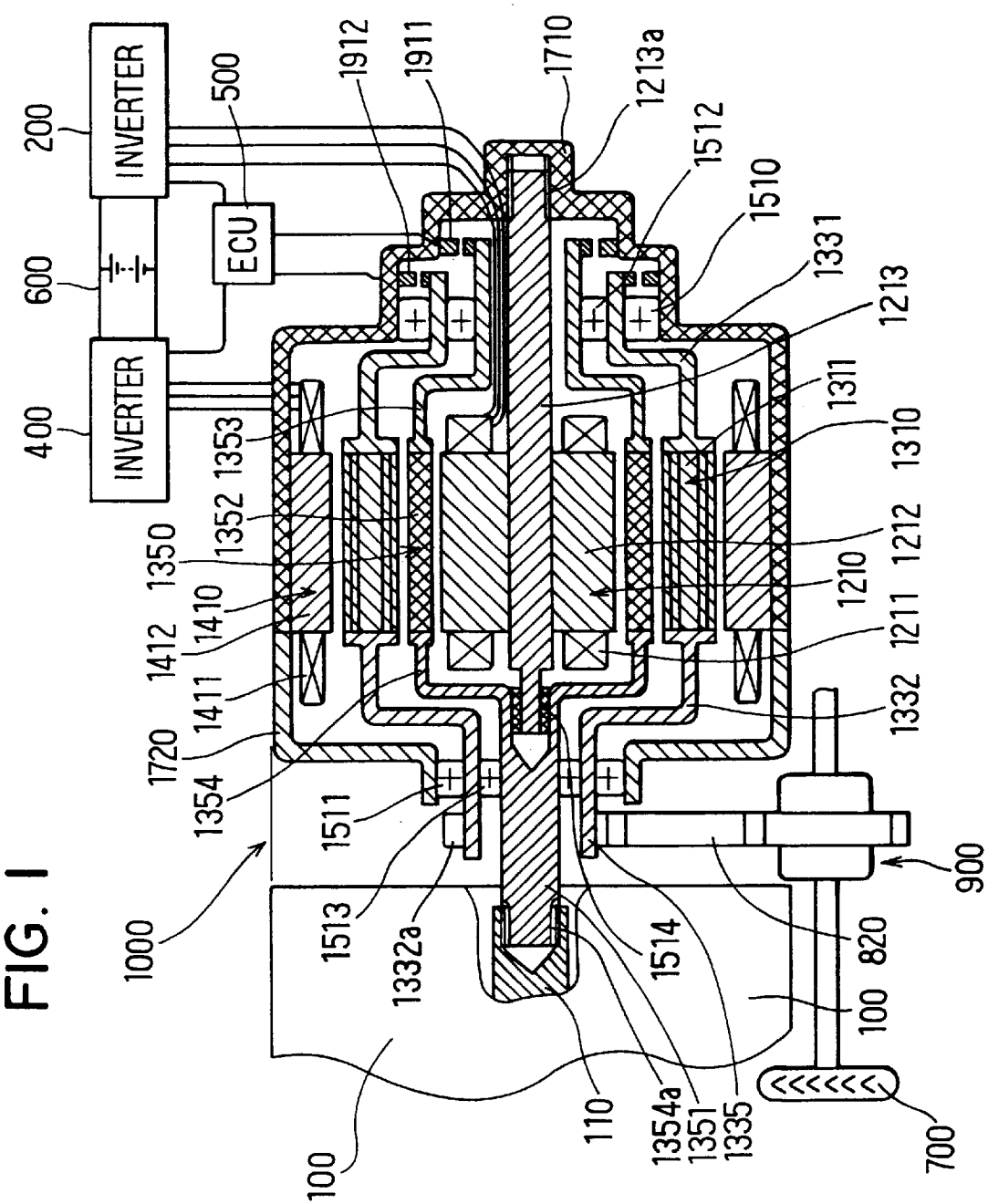
FIG. 1 is a cross-sectional view showing a whole structure of a rotational power converter as a first embodiment of the present invention.

A first embodiment of the present invention will be described in reference to FIGS. 1–7. First, referring to FIGS.

1 and 2, the whole structure of a rotational power converter 1000 will be described. The rotational power converter 1000 includes a rotational speed adjusting portion 1200, a torque adjusting portion 1400, an input shaft 1351 and an output shaft 1335. The input shaft 1351 is connected to an output shaft 110 of an internal combustion engine 100 via a spline 1354a, while the output shaft 1335 is connected to driving wheels 700 via speed reduction gears 820 and a differential gear 900. An inverter 200 is connected to the rotational speed adjusting portion 1200 and controls exciting current supplied thereto from a battery 600. An inverter 400 is connected to the torque adjusting portion 1400 and controls exciting current supplied thereto from the battery 600. An electronic control unit (ECU) 500 controls operation of the inverters 200, 400, based on signals fed from rotor position sensors 1911, 1912 and other signals.

More particularly, the rotational power converter 1000 is composed of: a first stator 1210 stably fixed in a housing; a first rotor 1350 rotatably housed in the housing and driven by the engine 100; a second rotor 1310 rotatably supported outside the first rotor 1350; and a second stator 1410 fixedly housed in the housing outside the second rotor 1310. The first stator 1210 includes a shaft 1213 fixed to a frame 1710 via spline 1213a, a cylinder-shaped magnetic core 1212 and a three-phase winding 1211 wound in the core 1212. The first rotor 1350 includes the input shaft 1351 connected to the output shaft 110 of the engine 100, rotor frames 1353, 1354 fixed to the input shaft 1351, and a cylindrical magnetic rotor core 1352 supported by both frames 1353, 1354.

The second rotor 1310 includes a pair of rotor frames 1331, 1332, the output shaft 1335 integrally formed with the frame 1332, a gear 1332a fixed to the output shaft 1355 that engages with the speed reduction gear 820, and a cylindrical rotor core 1311 supported by both frames 1331, 1332. The second stator 1410 includes a stator core 1412 and a three phase winding 1411 wound in the stator core 1412, both being fixedly housed in the housing 1720.

The first rotor 1350 disposed outside the first stator 1210 is rotatably supported by bearings 1512, 1513 and 1514 as shown in FIG. 1 and is driven by the engine 100. The second rotor 1310 disposed outside the first rotor 1350 is rotatably supported by bearings 1510, 1511, 1512 and 1513 as shown in FIG. 1.

Figure 2:
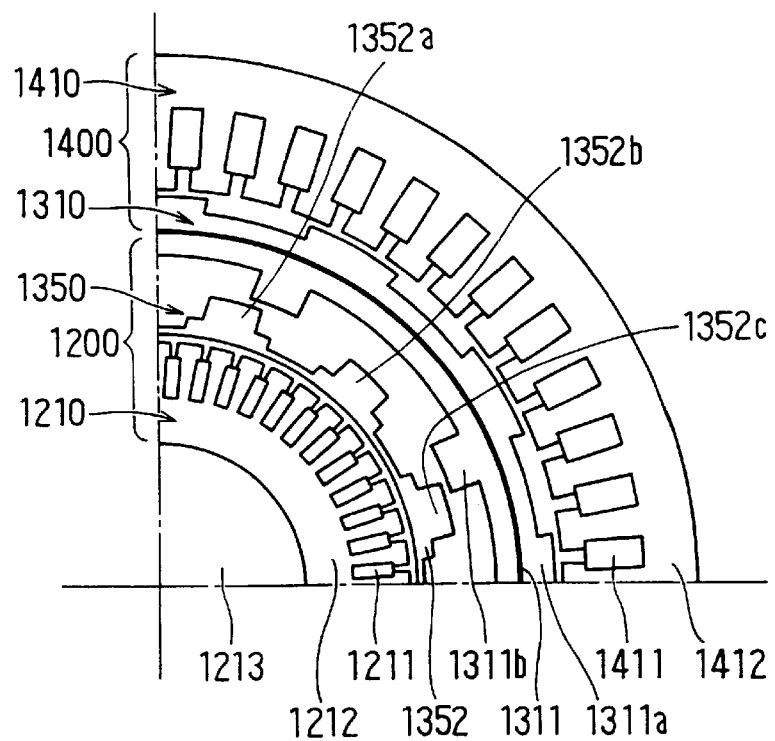
FIG. 2 is a partial cross-sectional view showing a main portion of the rotational power converter cut out along a surface perpendicular to a longitudinal axis of the converter.

As shown in FIG. 2, the core 1352 of the first rotor 1350 includes poles 1352a, 1352b, 1352c . . . which are projected toward the second rotor 1310. The core 1311 of the second rotor 1310 includes poles 1311b projected toward the first rotor 1350 and poles 1311a projected toward the second stator 1410. Three-phase excitation current is supplied to the winding 1211 of the first stator 1210, and thereby a rotating magnetic field is generated in the first stator 1210, and magnetic flux thereof flows through flux passages formed in three components, i.e., the first stator 1210, the first rotor 1350 and the second rotor 1310. The three components cooperatively form the rotational speed adjusting portion 1200. A magnetic field is generated also in the second stator 1410 by an excitation current supplied to the winding 1411 of the second stator 1410, and its magnetic flux flows through flux passages formed in two components, i.e., the second stator 1410 and the second rotor 1310. The two components cooperatively form the torque adjusting portion 1400.

The operation of the rotational speed adjusting portion 1200 will be described in reference to FIGS. 3A–5B. The position of the first rotor 1350 relative to the first stator 1210 is fixed in FIGS. 3A, 4A and 5A, and only the second rotor 1310 is rotated clockwise for explanation purpose. Situations where the first rotor 1350 rotates relative to the first stator 1210 will be explained later, referring to FIGS. 6A–6E.

Figure 3A:
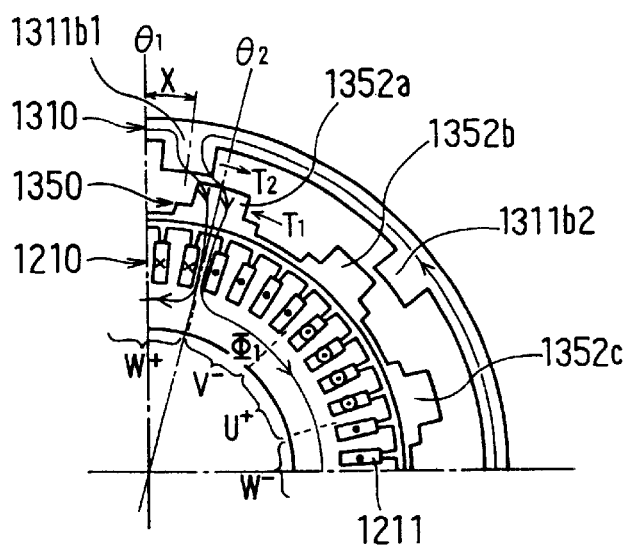
FIGS. 3A and 3B are drawings schematically showing magnetic flux passages in a stator and the first and second rotors of the rotational power converter and a relative torque between both rotors, where the second rotor position X is between $\theta_1$ and $\theta_2$.
Figure 3B:
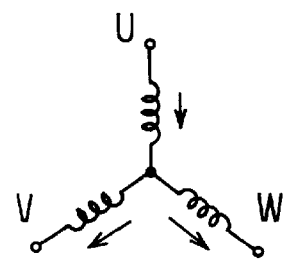

FIG. 3A shows flux passages of magnetic flux $\Phi 1$ in the first stator 1210, the first rotor 1350 and the second rotor 1310 when position X of the second rotor 1310 is between $\theta 1$ and $\theta_2$, where X is an angular position of the pole 1311b1 measured from the vertical line, $\theta_1$ denotes a position coinciding with the vertical line, and $\theta_2$ is an angular position of the pole 1352a measured from the vertical line. The flux $\Phi 1$ is generated by the exciting current supplied to the winding 1211 so that the flux flows through a flux passage including a pole 1352a and the other pole (not shown) located 90-degree apart from the pole 1352a in mechanical angle. The flux passage is formed in the first stator 1210, the first rotor 1350 and the second rotor 1310 as shown in FIG. 3A. Due to the flux $\Phi 1$, torques T1 and T2 act between the first rotor 1350 and the second rotor 1310 in the directions shown in FIG. 3A to decrease the magnetic energy. The amount of torque T1 is equal to that of torque T2. To minimize a torque acting between the first stator 1210 and the first rotor 1350, the exciting current is supplied so that the flux $\Phi 1$ flows through the center of the pole 1352a. The three-phase winding 1211 of the first rotor 1210 is a distributed winding with a four-slot unit structure as shown in FIG. 3A. When the second rotor takes the position X shown in FIG. 3A, the maximum current flows in the U-phase and branches out equally to both V-phase and W-phase as shown in FIG. 3B.

Figure 4A:
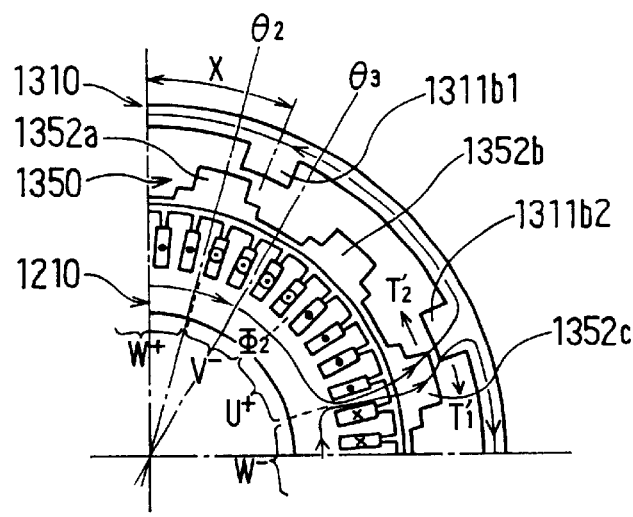
FIGS. 4A and 4B are the similar drawings as those of FIGS. 3A and 3B, where the second rotor position X is between $\theta_2$ and $\theta_3$.
Figure 4B:
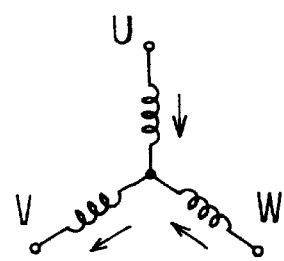

FIG. 4A shows flux passages of magnetic flux $\Phi 2$ in the first stator 1210, the first rotor 1350 and the second rotor 1310 when position X of the second rotor 1310 is between $\theta 2$ and $\theta 3$, where X is an angular position of the pole 1311b1 measured from the vertical line, $\theta 2$ is an angular position of the pole 1352a measured from the vertical line and $\theta 3$ is an angular position of a center between the pole 1352a and the pole 1352b measured from the vertical line. The flux $\Phi 2$ is generated by the exciting current supplied to the winding 1211 so that it flows through a flux passage including a pole 1352c and the other pole (not shown) located 90-degree apart from the pole 1352c in mechanical angle. The flux passage is formed in the first stator 1210, the first rotor 1350 and the second rotor 1310 as shown in FIG. 4A. Due to the flux $\Phi 2$, torques T1' and T2' act between the first rotor 1350 and the second rotor 1310 in the directions shown in FIG. 4A to decrease the magnetic energy. The amount of torque T1' is equal to that of torque T2'. When the second rotor takes the position X shown in FIG. 4A, the maximum current flows in the V-phase, adding up equal currents in both U-phase and W-phase as shown in FIG. 4B.

Figure 5A:
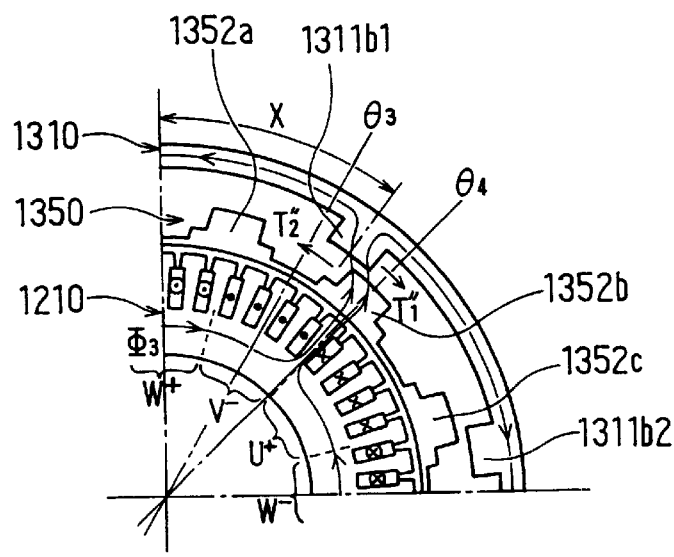
FIGS. 5A and 5B are the similar drawings as those of FIGS. 3A and 3B, where the second rotor position X is between $\theta_3$ and $\theta_4$.
Figure 5B:
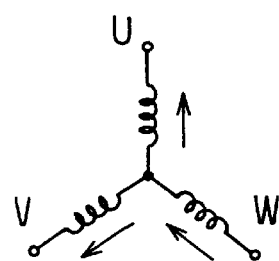

FIG. 5A shows flux passages of magnetic flux $\Phi 3$ in the first stator 1210, the first rotor 1350 and the second rotor 1310 when position X of the second rotor 1310 is between $\theta 3$ and $\theta_4$, where X is an angular position of the pole 1311b1 measured from the vertical line, $\theta 4$ is an angular position of the pole 1352b measured from the vertical line and $\theta 3$ is an angular position of a center between the pole 1352a and the pole 1352b measured from the vertical line. The flux $\Phi 3$ is generated by the exciting current supplied to the winding 1211 so that it flows through a flux passage including a pole 1352b and the other pole (not shown) located 90-degree apart from the pole 1352b in mechanical angle. The flux passage is formed in the first stator 1210, the first rotor 1350 and the second rotor 1310 as shown in FIG. 5A. Due to the flux $\Phi 3$, torques T1" and T2" act between the first rotor 1350 and the second rotor 1310 in the directions shown in FIG. 5A to decrease the magnetic energy. The amount of torque T1" is equal to that of torque T2". When the second rotor takes the position X shown in FIG. 5A, the maximum current flows in the W-phase and equally branches out to both U-phase and V-phase as shown in FIG. 5B.

The excitation current supplied to the three-phase winding 1211 of the first rotor 1210 is controlled so that a relative torque t between the first stator 1210 and the first rotor 1350 becomes smaller than a relative torque T between the first rotor 1350 and the second rotor 1310. Preferably, the excitation current is supplied with a timing that satisfies the following relation: T≧2t Referring to FIGS. 6A–6E, the magnetic flux generated by the three-phase excitation current, under the situation where the relative position between the first stator 1210 and the first rotor 1350 is changed while keeping the relative position between the first rotor 1350 and the second rotor 1310 at the same position as shown in FIG. 3A, will be explained. The three-phase rotating magnetic flux generated in the first stator 1210 is expressed in the formula: $\alpha(\cos t, \sin t)$, where $\alpha$ is an absolute maximum value of the flux and t is a conduction position (or timing), and the magnetic flux has waveforms as shown in FIG. 7. The direction of the rotating magnetic flux can be arbitrarily changed by controlling the conduction position.

Figure 6A:
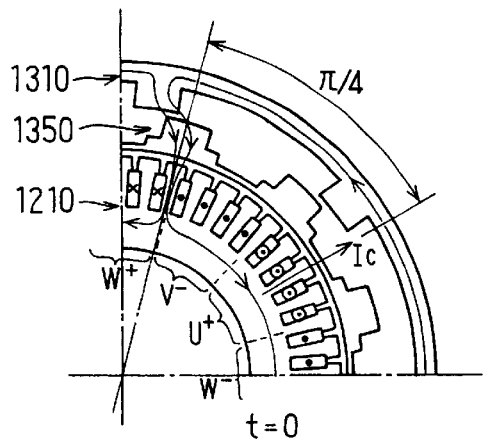
FIGS. 6A–6E are drawings schematically showing magnetic flux passages in a stator and the first and second rotors of the rotational power converter, where the first and second rotors are rotated in the clockwise direction relative to the stator while keeping the same relative position between the first and second rotors as that shown in FIG. 3A.
Figure 6B:
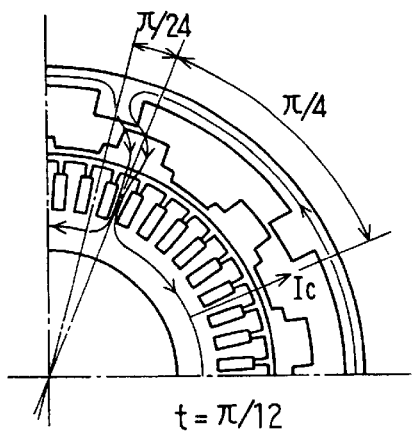
Figure 6C:
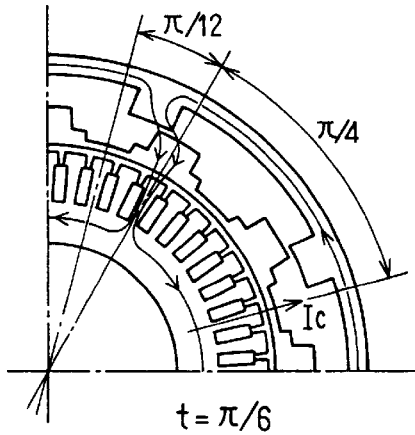
Figure 6D:
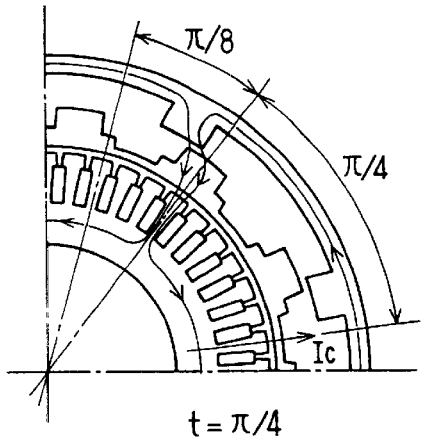
Figure 6E:
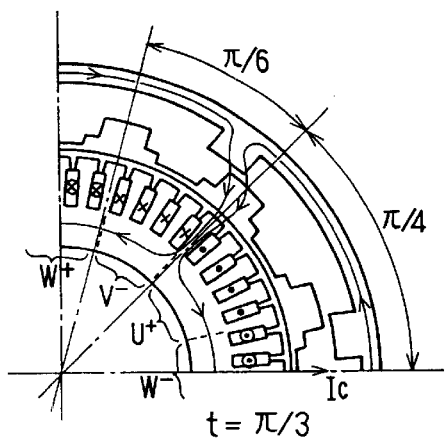
Figure 7:
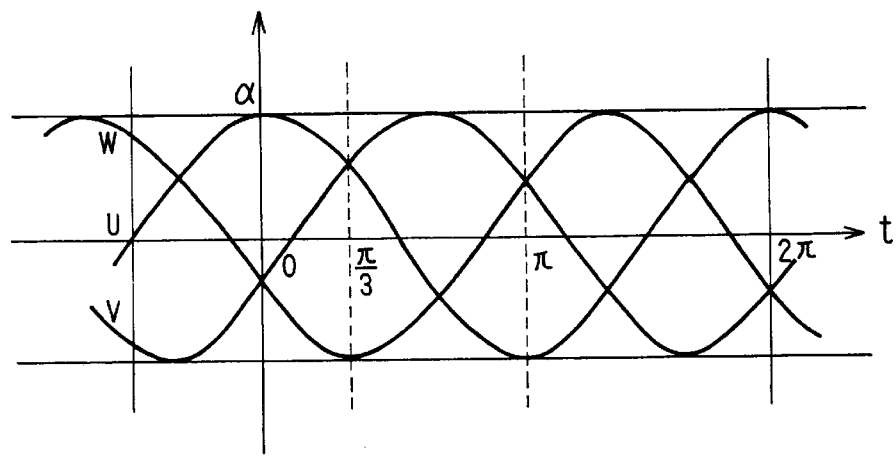
FIG. 7 is a graph showing waveforms of three-phase exciting current supplied to a winding of the stator.

FIG. 6A shows the situation where the conduction position t of each phase is zero (t=0). The rotation angle of the magnetic field is $\pi/12$ in electric angle and $\pi/24$ in mechanical angle at $t=\pi/12$, because the three-phase winding 1211 is arranged in a two-pole pair. The current center position Ic of the rotating magnetic field at a given relative position between the first stator 1210 and the first rotor 1350 is respectively shown in FIGS. 6A–6E. Also, the conduction position t is respectively shown in FIGS. 6A–6E. The relation between Ic and an amount of current in each phase is determined according to the relation between the amount of current in each phase and the conduction position t shown in FIG. 7. Accordingly, the excitation current can be controlled to generate the magnetic flux at a desired position when the relative position between the first stator 1210 and the first rotor 1350 is arbitrarily changed. The angular positions of the first rotor 1350 and the second rotor 1310 are detected by the sensors 1911 and 1912, respectively, and the excitation current control is performed based on the relative position between the first and second rotors.

In the first embodiment described above, the torque between the first rotor 1350 and the second rotor 1310 can be controlled and adjusted by controlling the excitation current supplied to the first stator 1210 without using the electric feeder composed of slip-rings and brushes. Therefore, the space for the electric feeder is saved, and reliability of the rotational power converter is improved at the same time. The first and second rotors are operated according to a reluctance motor theory. In a usual reluctance motor, however, current concentration becomes high due to a low utilization of winding. This undesirable current concentration can be alleviated in the converter according to the present invention.

Figure 8:
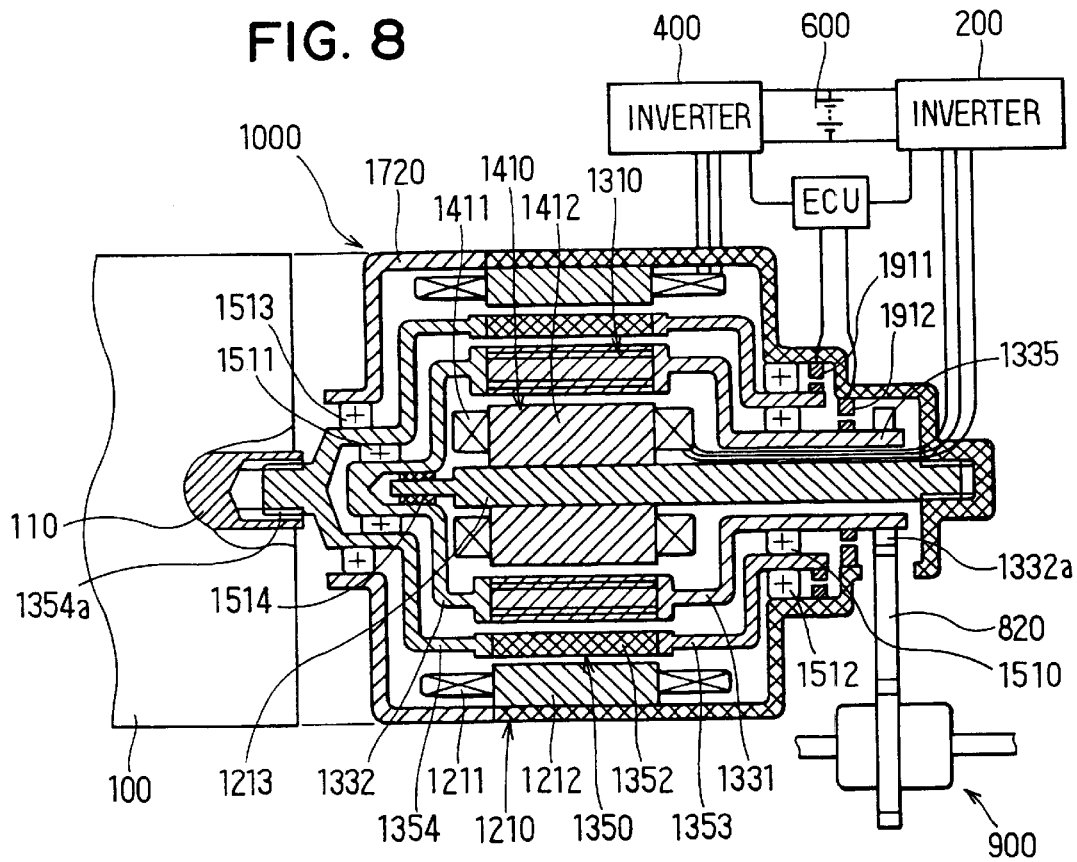
FIG. 8 is a cross-sectional view showing a rotational power converter as a second embodiment of the present invention.

FIG. 8 shows a second embodiment of the present invention. In this embodiment, the relative positions of rotors and stators in the housing are reversed, compared with those in the first embodiment. That is, the second stator 1410 is disposed in the center of the housing, the second rotor 1310 is positioned outside the second stator 1410, the first rotor 1350 is positioned outside the second rotor 1310, and finally the first stator 1210 is located outside the first rotor 1350. The output shat 1335 of the second rotor 1310 is connected to the differential gear 900 at its end portion opposite to the engine side. This embodiment is advantageous in the power converter in which a large amount of speed adjustment is required, because the first stator 1210 takes an outermost position. Other structures of the second embodiment are the same as those of the first embodiment, and the second embodiment operates in the same manner as the first embodiment.

Figure 9:
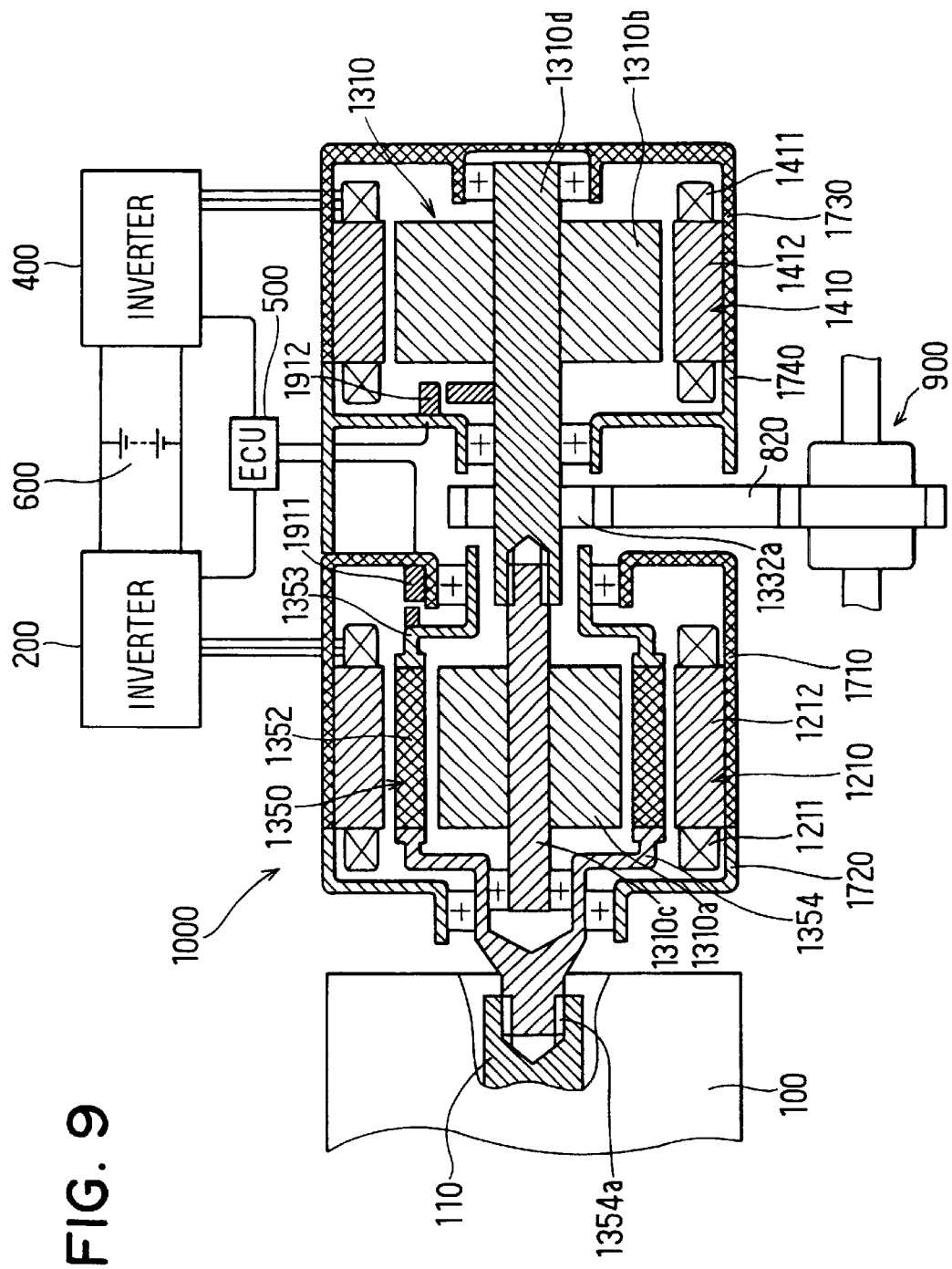
FIG. 9 is a cross-sectional view showing a rotational power converter as a third embodiment of the present invention.

A third embodiment of the present invention is shown in FIG. 9. This embodiment is structured differently from the first embodiment, but its operation is similar. The second rotor 1310 is separated into two portions connected in tandem, and the all the components of the rotational power converter 1000 is housed in the housing composed of a first housing 1720, a second housing 1730 and frames 1710, 1740.

The second rotor 1310 is composed of a front portion having a first shaft 1310c and a first core 1310a, and a rear portion having a second shaft 1310d and a second core 1310b. The first shaft 1310c and the second shaft 1310d are mechanically connected, and the second rotor 1310 as a whole rotatably supported in the housing. The second shaft 1310d is connected to the differential gear 900 via the speed reduction gears 1332a, 820 to transfer the rotational torque to the driving wheel 700. The first rotor 1350 that is driven by the engine 100 is rotatably supported in the housing outside the second rotor 1310. The first stator 1210 is disposed outside the first rotor 1350 and fixedly supported in the first housing 1720. The second stator 1410 is disposed outside the second rotor 1310 and fixedly supported in the second housing 1730.

The rotating magnetic field is generated in the first stator 1210, and the magnetic flux flows through flux passages formed in the first stator 1210, the first rotor 1350 and the second rotor 1310. The first rotor 1350 is rotated by the output shaft 110 of the engine 100, thereby generating rotational torque between the first rotor 1350 and the second rotor 1310. The second rotor is driven by the rotational torque generated, and its rotational power is transferred to the driving wheel 700 of an automotive vehicle.

Since the second embodiment has a tandem structure, its outer diameter can be made smaller compared with that of the first embodiment.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A rotational power converter for converting a rotational output of an internal combustion engine into a power for driving a hybrid electric vehicle, the rotational power converter comprising:

an input shaft connected to an output shaft of the engine;

an output shaft for connecting to driving wheels of the vehicle;

a housing;

a first stator fixedly housed in the housing, the first stator having a winding for generating a rotating magnetic field;

a first rotor connected to the input shaft and rotatably supported in the housing;

a second rotor connected to the output shaft and rotatably supported in the housing, wherein:

the first rotor is driven by the engine;
a rotational power of the first rotor is electromagnetically transferred to a rotational power of the second rotor, giving a rotational power thereto;
the rotational power of the second rotor is transferred to the driving wheels of the vehicle; and
the rotational power of the second rotor is controlled by controlling the rotating magnetic field generated in the stator.

2. The rotational power converter as in claim 1, further including a second stator fixedly housed in the housing with a third air gap formed between the second rotor and the second stator, the second stator having a winding for generating a magnetic field, wherein:
the first stator, the first rotor and the second rotor cooperatively form a first rotating electric machine;
the second rotor and the second stator cooperatively form a second rotating electric machine;
the winding of the first stator is configured to be connected to a DC battery through a first inverter that controls the magnetic field generated in the first stator, so that the DC battery supplies electric power to or receives electric power from the first stator according to the rotational power of the second rotor; and
the winding of the second stator is adapted to be connected to the DC battery through a second inverter that controls the magnetic field generated in the second stator, so that the DC battery supplies electric power to or receives electric power from the second stator according to the rotational power of the second rotor.

See the attached Appendix for the changes made to effect the above claims.

3. The rotational power converter as in claim 2, wherein:
the first stator is fixedly housed in the housing along a longitudinal center axis of the housing;
the first rotor is rotatably supported in the housing outside the first stator, surrounding the first stator;
the second rotor is rotatably supported in the housing outside the first rotor, surrounding the first rotor; and
the second stator is fixedly housed in the housing outside the second rotor, surrounding the second rotor.

4. The rotational power converter as in claim 2, wherein:
the first rotor includes a cylindrical magnetic core having poles projected toward the second rotor; and
the second rotor includes a cylindrical magnetic core having poles projected toward the first rotor.

5. The rotational power converter as in claim 2, wherein:
the winding of the first stator is a three-phase winding; and
electric current supplied to the three-phase winding is controlled so that a rotational torque between the first rotor and the second rotor becomes equal to or higher than two times of a rotational torque between the first stator and the first rotor.

6. The rotational power converter as in claim 2, wherein:
the second stator is fixedly housed in the housing along a longitudinal center axis of the housing;
the second rotor is rotatably supported in the housing outside the second stator, surrounding the second stator;
the first rotor is rotatably supported in the housing outside the second rotor, surrounding the second rotor; and
the first stator is fixedly housed in the housing outside the first rotor, surrounding the first rotor.

7. The rotational power converter as in claim 2, wherein:
the second rotor is divided into a front portion and a rear portion, both portions being mechanically connected to each other, the front portion being rotatably supported in a front part of the housing, the rear portion being rotatably supported in a rear part of the housing, both portions of the second rotor being disposed along a longitudinal center axis of the housing;
the first rotor is rotatably supported in the front part of the housing, surrounding an outer periphery of the front portion of the second rotor;
the first stator is fixedly housed in the front part of the housing, surrounding an outer periphery of the first rotor; and
the second stator is fixedly housed in the rear part of the housing, surrounding an outer periphery of the rear portion of the second rotor.

8. A rotational power converter comprising:
an input shaft driven by a rotational power source;
an output shaft connected to an outside device to be driven;
a housing;
a stator fixedly housed in the housing, the stator having a winding for generating a rotating magnetic field;
a first rotor connected to the input shaft and rotatably supported in the housing with a first air gap formed between the stator and the first rotor; and
a second rotor connected to the output shaft and rotatably supported in the housing with a second air gap formed between the first rotor and the second rotor:
a rotational power of the first rotor is electromagnetically transferred to the second rotor to rotate the second rotor; and
a rotational power of the second rotor is controlled by controlling the rotating magnetic field generated in the stator.

9. The rotational power converter as in claim 8, wherein:
the first rotor includes a cylindrical magnetic core having poles projected toward the second rotor; and
the second rotor includes a cylindrical magnetic core having poles projected toward the first rotor.

* * * * *